(12) United States Patent
Park

(10) Patent No.: US 11,688,848 B2
(45) Date of Patent: Jun. 27, 2023

(54) METHOD AND SYSTEM FOR PULVERIZATION MITIGATION ADDITIVES FOR SILICON DOMINANT ANODES

(71) Applicant: Enevate Corporation, Irvine, CA (US)

(72) Inventor: Benjamin Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 17/172,049

(22) Filed: Feb. 9, 2021

(65) Prior Publication Data

US 2022/0255053 A1    Aug. 11, 2022

(51) Int. Cl.

| H01M 4/134 | (2010.01) |
|---|---|
| H01M 4/38 | (2006.01) |
| H01M 4/66 | (2006.01) |
| H01M 4/62 | (2006.01) |
| H01M 4/1395 | (2010.01) |
| H01M 10/0525 | (2010.01) |
| H01M 4/02 | (2006.01) |

(52) U.S. Cl.
CPC ......... *H01M 4/134* (2013.01); *H01M 4/1395* (2013.01); *H01M 4/386* (2013.01); *H01M 4/625* (2013.01); *H01M 4/626* (2013.01); *H01M 4/661* (2013.01); *H01M 10/0525* (2013.01); *H01M 2004/021* (2013.01)

(58) Field of Classification Search
CPC .................................................. H01M 4/134
See application file for complete search history.

(56) References Cited

U.S. PATENT DOCUMENTS

| 10,673,062 B1* | 6/2020 | Pestana .............. H01M 4/1395 |
|---|---|---|
| 2014/0332731 A1* | 11/2014 | Ma .......................... C09D 7/70 |
| | | 252/506 |
| 2016/0315318 A1* | 10/2016 | Park ..................... H01M 4/463 |

FOREIGN PATENT DOCUMENTS

| CN | 108306006 | * | 2/2018 |
|---|---|---|---|
| CN | 108306006 A | * | 7/2018 |
| CN | 110690421 | * | 1/2020 |
| CN | 110690421 A | * | 1/2020 |

(Continued)

*Primary Examiner* — Ula C Ruddock
*Assistant Examiner* — Thomas H. Parsons
(74) *Attorney, Agent, or Firm* — McAndrews, Held & Malloy, Ltd.

(57) ABSTRACT

Systems and methods for pulverization mitigation additives for silicon dominant anodes may include an electrode including a metal current collector and an active material layer on the current collector. The active material layer may include islands of material separated by cracks, where the islands may include silicon, pyrolyzed binder, and conductive additives. At least a portion of the additives bridge the cracks of the active material layer and the additives may include between 1% and 40% of the active material layer. The active material layer may include between 20% to 95% silicon. The conductive additives may include carbon nanotubes and/or graphene sheets. The conductive additives may include metal, such as one or more of: gallium, indium, copper, aluminum, lead, tin, and nickel. The metal may include a transition metal, and/or one or more semiconductors. The conductive additives may include long narrow filaments with an aspect ratio of 20 or greater.

23 Claims, 5 Drawing Sheets

(56) References Cited

FOREIGN PATENT DOCUMENTS

| WO | WO2018117087 | * | 6/2018 |
| WO | WO2018117087 A1 | * | 6/2018 |
| WO | WO2020050661 | * | 3/2020 |
| WO | WO2020050661 A1 | * | 3/2020 |

* cited by examiner

METHOD AND SYSTEM FOR PULVERIZATION MITIGATION ADDITIVES FOR SILICON DOMINANT ANODES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for pulverization mitigation additives for silicon dominant anodes.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for pulverization mitigation additives for silicon dominant anodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
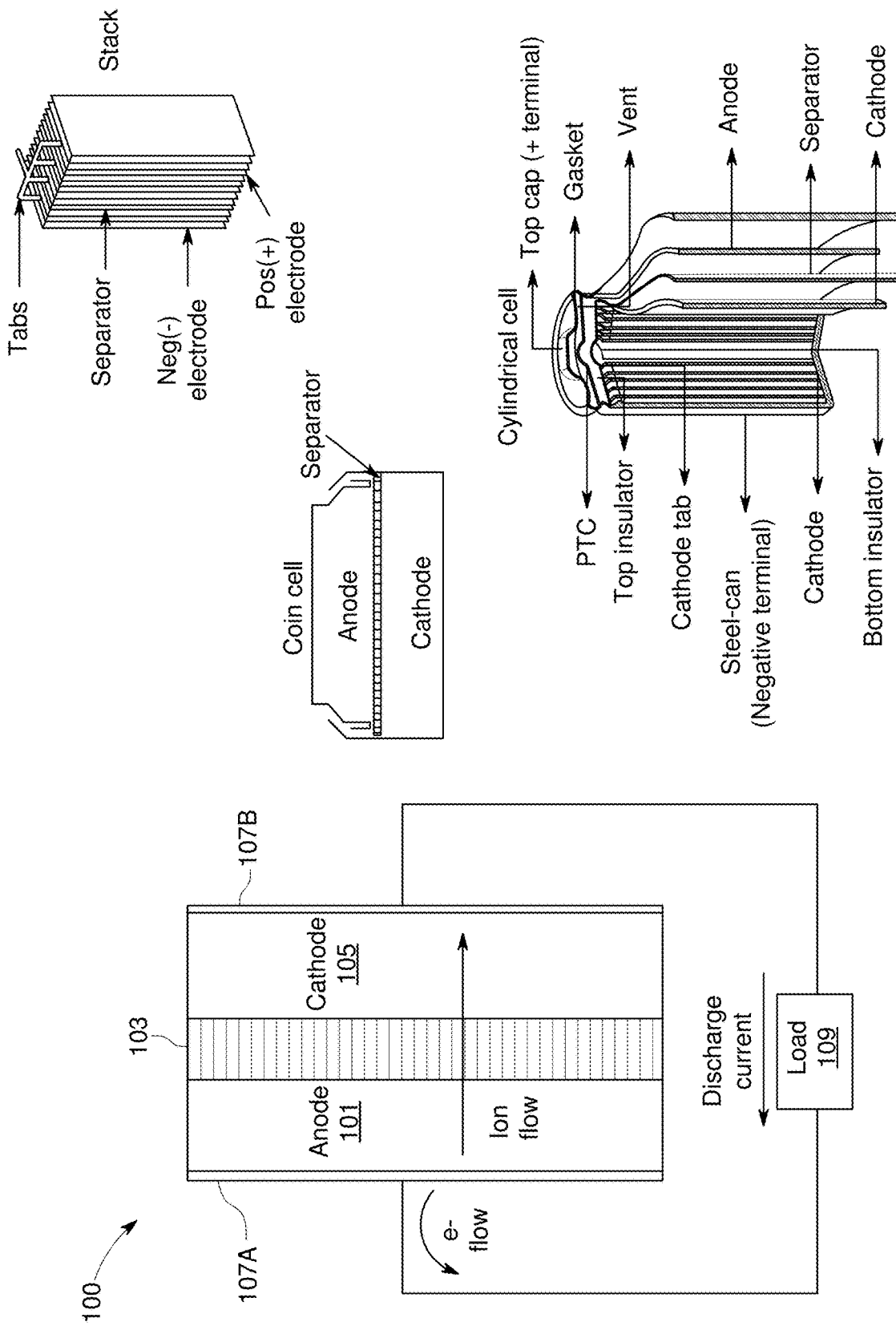
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

A solution to enhance the electrical conductivity of Li-ion battery anodes and cathodes is to introduce conductive structural additives to the anode active material layer. The additives may comprise materials that are stronger than the binder materials, able to withstand the expansion and contraction caused by the lithiation of the silicon, providing a structural and electrical connection between cracked regions of the active material layer. The materials may comprise long filaments (1D), such as carbon nanotubes, for example, planar sheets (2D), such as graphene, or chunks of material (3D). Two primary benefits of adding conductive additives to anodes and cathodes are improved particle-to-particle conductivity and improved particle-to-current-collector conductivity. These additives maintain conductive pathways for electrons, minimizing capacity loss in electrode active materials and, thus, enhancing the overall performance of Li-ion batteries.

Figure 2A:
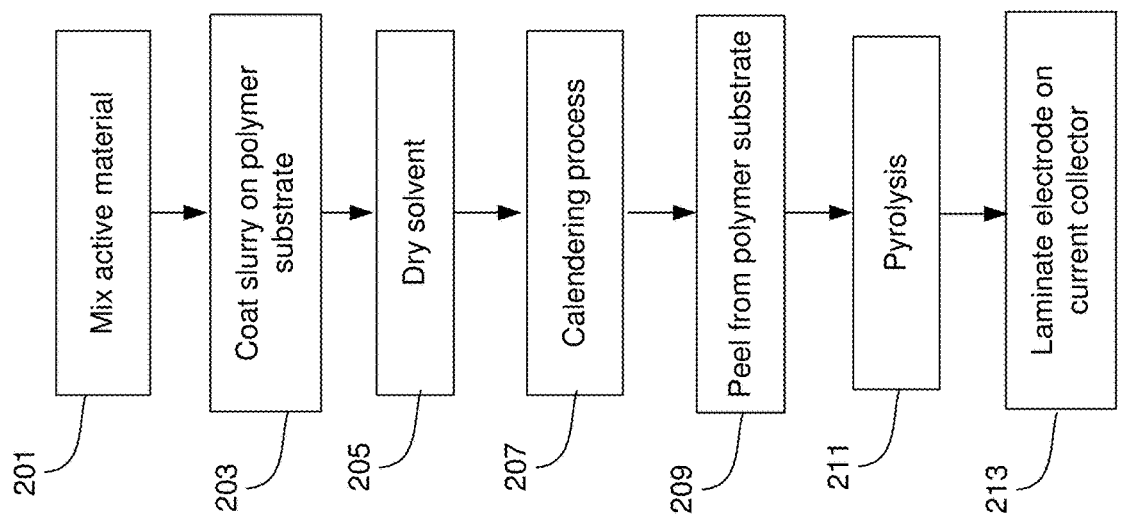
FIG. 2A is a flow diagram of a lamination process for forming a silicon anode with pulverization mitigation additives, in accordance with an example embodiment of the disclosure.

FIG. 2A is a flow diagram of a lamination process for forming a silicon anode with pulverization mitigation additives, in accordance with an example embodiment of the disclosure. This process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as PI, PAI), solvent, and conductive structural additives. For example, the additives may comprise conductive materials that also provide structural continuity between cracks in the anode following multiple cycles. The materials may comprise carbon nanotubes/fibers, graphene sheets, metal polymers, metals, semiconductors, and/or metal oxides, for example. The additives may comprise 1D filaments with one dimension at least 4×, at least 10×, or at least 20× that of the other two dimensions, 2D sheets or mesh with two dimensions at least 4×, at least 10×, or at least 20× that of the other dimension, or 3D structures with one dimension at least 20×, at least 10×, or at least 4× that of the other two, where none of the dimensions are of nanoscale size. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then in step 205 undergo drying to an anode coupon with high Si content and less than 15% residual solvent content. This may be followed by an optional calendering process in step 207, where a series of hard pressure rollers may be used to finish the film/substrate into a smoothed and denser sheet of material.

In step 209, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 211 where the material may be heated to >900 C but less than 1250 C for 1-3 hours, cut into sheets, and vacuum dried using a two-stage process (120° C. for 15 h, 220° C. for 5 h). The dry film may be thermally treated at, e.g., 1100-1200° C. to convert the polymer matrix into carbon.

In step 213, the electrode material may be laminated on a current collector. For example, a 5-20 μm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The process described above is one example process that represents a composite with fabrication steps including pyrolysis and lamination. Another example scenario comprises a direct coating process in which an anode slurry is directly coated on a copper foil using a binder such as CMC, SBR, Sodium Alginate, PAI, PI and mixtures and combinations thereof. The process in this example comprises: direct coat active material on a current collector, dry, calender, heat treatment.

In a direct coating process, an anode slurry is coated on a current collector with residual solvent followed by a calendaring process for densification followed by pyrolysis (~500-800 C) such that carbon precursors are partially or completely converted into glassy carbon. Pyrolysis can be done either in roll form or after punching. If done in roll form, the punching is done after the pyrolysis process.

In another example of a direct coating process, an anode slurry may be coated on a current collector with low residual solvent followed by a calendaring process for densification followed by removal of residual solvent.

In an example scenario, the conductive structural additives, such as might be added in step 201 or 221 may comprise between 1 and 40% by weight of the anode composition, with between 50% and 99% silicon by weight. The fibrous (1D) particles may have an aspect ratio of at least 4, but may be higher than 10, higher than 20, or higher than 40, for example, and may comprise a tubular or fiber-like conductive structure with nanoscale size in two-dimensions, where carbon-based examples comprise carbon nanotubes, carbon nanofibers (CNF), and vapor grown carbon fibers (VGCP). Other fibrous structures are possible, such as metals, metal polymers, metal oxides The 2D carbon structures may have an average dimension in the micron scale in each of the two non-nanoscale dimensions that is at least 4× that in the thickness direction, for example, and may be at least 20× larger, or at least 40× larger in the lateral directions as compared to the thickness direction. Graphene sheets are an example of conductive carbon additives, while other 2D structures are possible, such as "wire" meshes of metal or metal polymers, for example.

Furthermore, the active material may comprise 3D conductive structural additives, where the material is not limited to nanoscale in any one dimension. In a 3D additive example, one dimension of the structure may be at least 4×, at least 10×, or at least 20× that of the other two dimensions, where none of the dimensions are of nanoscale size. Examples of 3D conductive structural additives may be "chunks" of carbon, metal, metal polymer, or semiconductors.

In another example scenario, the anode active material layer fabricated with the carbon additive described above may comprise 20 to 95% silicon and in yet another example scenario may comprise 50 to 95% silicon by weight.

Figure 2B:
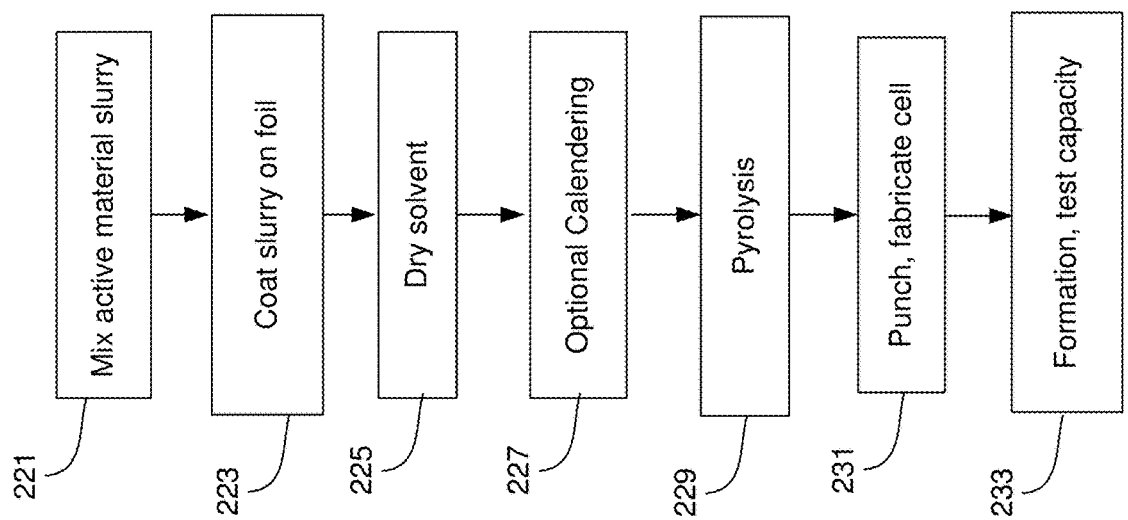
FIG. 2B is a flow diagram of a direct coating process for forming a silicon anode with pulverization mitigation additives, in accordance with an example embodiment of the disclosure.

FIG. 2B is a flow diagram of a direct coating process for forming a silicon anode with pulverization mitigation additives, in accordance with an example embodiment of the disclosure. This process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI and mixtures and combinations thereof.

In step 221, the active material may be mixed, e.g., a binder/resin (such as PI, PAI), solvent, and conductive and structural additive. For example, the additives may comprise conductive materials that also provide structural continuity between cracks in the anode following multiple cycles. The materials may comprise carbon nanotubes/fibers, graphene sheets, metal polymers, metals, semiconductors, and/or metal oxides, metal/carbon nanofiber or metal/carbon nanotube composites, carbon nanowire bundles, for example. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on a copper foil. Similarly, cathode active materials may be coated on a foil material, such as aluminum, for example. The active material layer may undergo a drying in step 225 resulting in reduced residual solvent content. An optional calendering process may be utilized in step 227 where a series of hard pressure rollers may be used to finish the film/substrate into a smoother and denser sheet of material. In step 227, the foil and coating proceeds through a roll press for lamination.

In step 229, the active material may be pyrolyzed by heating to 500-1000° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 231. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 233, the cell may be subjected to a formation process, comprising initial charge and discharge steps to lithiate the anode, with some residual lithium remaining, and the cell capacity may be assessed.

Figure 3:
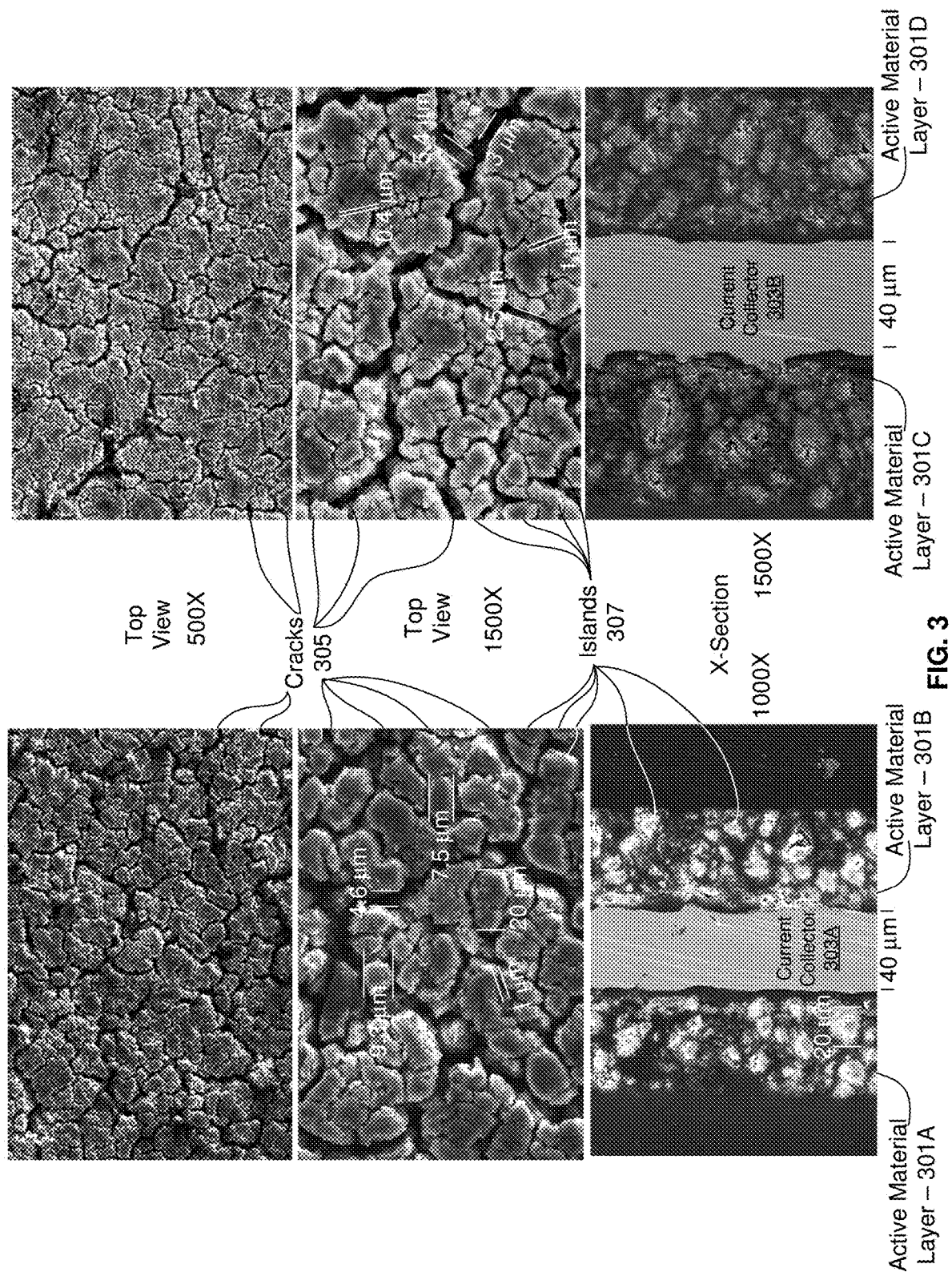
FIG. 3 illustrates anode active material layers on a current collector after multiple cycles, in accordance with an example embodiment of the disclosure.

FIG. 3 illustrates anode active material layers on a current collector after multiple cycles, in accordance with an example embodiment of the disclosure. The scanning electron microscope (SEM) images show two anodes at different magnifications, with the top two rows being top-down images of the surface of the anode active material layer and the bottom row being cross-sectional images of the anode active material layers on both sides of a metal current collector.

The cross-sectional view shows active material layers 301A-301D on current collectors 303A and 303B, while the top two rows show top views of the active material layers 301A and 301B. The active material layers 301A-301D do not include the conductive structural additives described above. As can be seen from the images, the active material layers 301A-301D become cracked after multiple charge/discharge cycles, 200 cycles in this example, where pulverization occurs due to expansion and contraction due to lithiation/delithiation of the silicon during cycling. This results in voids or cracks 305 and islands 307, where the large number of cracks/voids and islands shown in the images precludes labeling each incidence of these structures. As these pulverized sections, or islands 307, may become detached from adjacent material and even detached from the collector 303A or 303B, cell cycle capacity may be decreased, as separated material may have reduced or no electrical connection to the current collector, causing a voltage drop. In an example embodiment, cracks 305 may cause mirror image surfaces in adjacent islands 307 where, for example, a depression in one island results in an extension in an adjacent island.

The cracks 305 in the active material layers 301A-301D may range from sub-micron size to several microns across, as shown by the various dimensions shown in the SEM images, and even above 10 microns for higher cycle numbers. In addition, the cracks 305 may extend partway through the thickness of the active material layers 301A-301D or may extend all the way down to the current collectors 303A or 303B. Similarly, the expansion and contraction of the active material layers may result in islands 307 of the active material layers 301A-301D separated by the cracks, where the islands 307 may be as small as sub-micron size and as large as tens of microns.

Spatial separation between islands of active material layer may result in reduced cell capacity since electron flow may be inhibited by increased resistance or even open circuit conditions for some portions. This may be mitigated by conductive structural additives in the active material layer, as discussed further with respect to FIG. 4. These additives may extend across the cracks between islands, thereby providing both a structural connection that mitigates further pulverization, as well as a conductive path between islands, stabilizing impedance and reducing the cycle loss of the cell.

Figure 4:
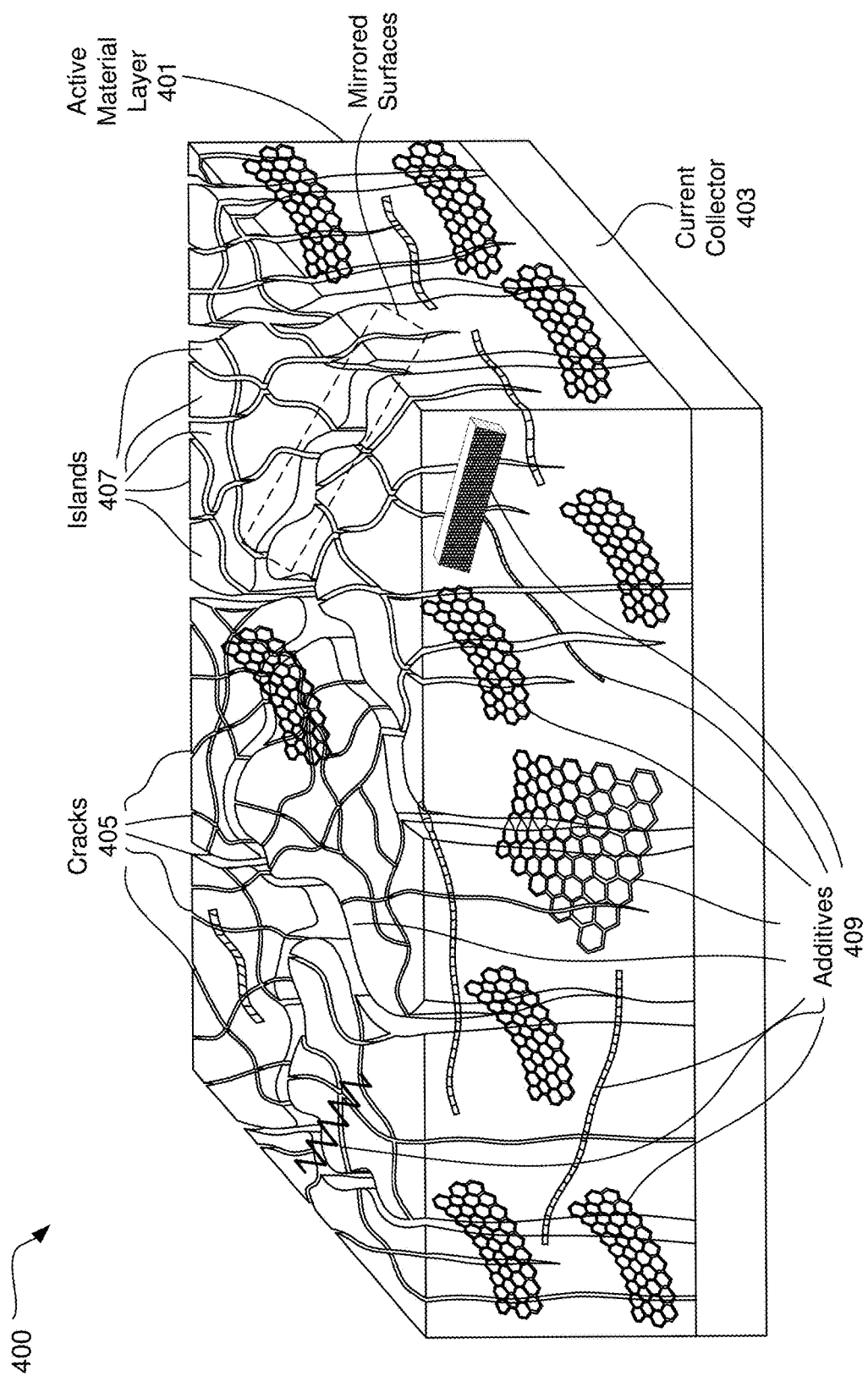
FIG. 4 illustrates an anode active material layer with conductive structural additives, in accordance with an example embodiment of the disclosure.

FIG. 4 illustrates an anode active material layer with conductive structural additives, in accordance with an example embodiment of the disclosure. Referring to FIG. 4, there is shown an anode 400 comprising an active material layer 401 on a current collector 403. The active material layer 401 may comprise cracks 405 and islands 407 with pulverization mitigation additives 409. The cracks 405 and islands 407 may be formed by expansion and contraction of the active material layer 401 during formation and/or normal cycling from lithiation and delithiation of the cell in which the anode 400 is integrated. The cracks 405 may cause mirror image surfaces in adjacent islands 407 where, for example, a depression in one island results in an extension in an adjacent island, as illustrated by the "Mirrored Surfaces" label in FIG. 4. The active material layer 401 is shown as partially transparent to show the extent of the additives 409 as being throughout the layer, and the density and size of the additives are merely examples. The additives 409 are large enough that a least a portion of the additives extend from within islands 407 and bridge across the cracks 405.

The additives 409 may comprise metal, carbon nanotubes/fibers, graphene sheets, metal polymers, semiconductors, and/or metal oxides, graphene sheets, metal polymers, metals, semiconductors, and/or metal oxides, metal/carbon nanofiber or metal/carbon nanotube composites, carbon nanowire bundles. The additives 409 may comprise filaments, sheets, 3D structures with one dimension larger than the other two, or a combination thereof. The conductive additives 409 extend between the islands 407 thereby providing a conductive channel between the islands and also provides a mechanical connection to mitigate further pulverization. Metals may comprise copper, nickel, stainless steel, tungsten, or other high strength metals. In another example scenario, the additives 409 may comprise a metal with a lower melting point, such as gallium, indium, or other metal, metal alloy, or eutectic, as long as it does not adversely react with other materials in the active material layer 401 or the current collector 403. The lower melting point metal may melt during operation of the cell and fill in cracks formed by expansion and contraction, solidifying again after the cell returns to near room-temperature, providing a low impedance coupling between the islands as well as a thermal path for heat. This melting/solidifying may repeat with each thermal cycle, improving the cycle retention.

In another example, the additives 409 may comprise strain-absorbing structures, such as flexible conductors comprising metal polymers, for example, where the additives 409 continue to bridge gaps between islands 407 in the active material layers during lithiation/delithiation expansion/contraction cycles. In one example, the additives comprise coil-like structures for strain-absorbing and providing conductivity between islands 407, the coil-like structures comprising coiled/twisted metal or carbon nanotubes, for example.

In yet another example, the additives 409 may comprise 2D structures, such as conductive mesh or graphene sheets, indicated by the regular hexagon patterns in the figure. Conductive mesh may comprise metal or metal polymer, for example. The mesh or sheets have lateral dimensions that are large enough to bridge any cracks in the active material layer 401, extending up to several tens of microns, for example.

In another example scenario, the additives 409 may comprise 3D structures, such as a cylindrical or rectangular shape with a length that is at least 4×, at least 10×, or at least 20× that of the other dimensions, where none of the dimensions are nanoscale size. In another example, the additives 409 may comprise a metal foam with dimensions large enough to extend from within an island 407 across a crack 405 to another of the islands 407. This may provide improved electrical conductivity but also provides structural resistance to pulverization, where active material may be within and external to the conductive metal foam structure, thereby embedding the foam. This embedding of additives 409 provides enhanced structure and improved conductivity. In addition, the additives 409 may comprise blocks of conductive material with one dimension large enough to bridge any crack 405 that may form in the active material layer 401.

In another example scenario, the additives 409 may comprise a conductive polymer in fiber, sheet, or cylindrical/rectangular form, that may be embedded within active material layer 401, where the conductive material is capable of withstanding the processing and operational temperatures encountered by the anode 400.

In an example embodiment of the disclosure, a method and system is described for pulverization mitigation additives for silicon dominant anodes. The anode may comprise an active material. The active material may comprise an electrode comprising a metal current collector and an active material layer on the current collector. The active material layer may comprise islands of material separated by cracks, where the islands may comprise silicon, pyrolyzed binder, and conductive additives, and wherein at least a portion of the additives may bridge the cracks of the active material layer.

The conductive additives may comprise between 1% and 40% of the active material layer. The active material layer may comprise between 20% to 95% silicon. The conductive additives may comprise carbon nanotubes and/or graphene sheets. The conductive additives may comprise metal. The metal may comprise one or more of: gallium, indium, copper, aluminum, lead, tin, nickel. The metal may comprises a transition metal. The conductive additives may comprise one or more semiconductors. The conductive additives may comprise long narrow filaments with an aspect ratio of 20 or greater. The cracks may form after one or more formation processes and/or one or more lithiation/delithiation cycles of a battery incorporating the electrode.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery electrode, the electrode comprising:
   a metal current collector; and
   an active material layer on the current collector, wherein the active material layer comprises:
   islands of material separated by cracks, the islands comprising:
   silicon;
   pyrolyzed binder; and
   conductive additives, wherein at least a portion of the additives extend from within the islands and bridge the cracks of the active material layer;
   wherein:
   the conductive additives comprise one-dimensional (1D) conductive additives, two-dimensional (2D) conductive additives, and three-dimensional (3D) conductive additives; and
   one of the 1D conductive additives, the 2D conductive additives, and the 3D conductive additives is at least 4× of the conductive additives of other dimensions.

2. The electrode according to claim 1, wherein the active material layer comprises between 20% to 95% silicon.

3. The electrode according to claim 1, wherein the conductive additives comprise carbon nanotubes and/or graphene sheets.

4. The electrode according to claim 1, wherein the conductive additives comprise metal.

5. The electrode according to claim 4, wherein the metal comprises one or more of: gallium, indium, copper, aluminum, lead, tin, nickel.

6. The electrode according to claim 4, wherein the metal comprises a transition metal.

7. The electrode according to claim 1, wherein the conductive additives comprise one or more semiconductors.

8. The electrode according to claim 1, wherein the conductive additives comprise long narrow filaments with an aspect ratio of 20 or greater.

9. The electrode according to claim 1, wherein the cracks form after one or more formation processes and/or one or more lithiation/delithiation cycles of a battery incorporating the electrode.

10. The electrode according to claim 1, wherein islands adjacent to a particular crack have mirror image surfaces facing the particular crack.

11. The electrode according to claim 1, wherein the conductive additives comprise between 1% and 40% of the active material layer.

12. A method of forming an electrode, the method comprising:
providing a metal current collector; and
providing an active material layer on the current collector, wherein the active material layer comprises:
islands of material separated by cracks, the islands comprising:
silicon;
pyrolyzed binder; and
conductive additives, wherein at least a portion of the additives extend from within the islands and bridge the cracks of the active material layer;
wherein:
the conductive additives comprise one-dimensional (1D) conductive additives, two-dimensional (2D) conductive additives, and three-dimensional (3D) conductive additives; and
one of the 1D conductive additives, the 2D conductive additives, and the 3D conductive additives is at least 4× of the conductive additives of other dimensions.

13. The method according to claim 12, wherein the active material layer comprises between 20% to 95% silicon.

14. The method according to claim 12, wherein the conductive additives comprise carbon nanotubes and/or graphene sheets.

15. The method according to claim 12, wherein the conductive additives comprise metal.

16. The method according to claim 15, wherein the metal comprises one or more of: gallium, indium, copper, aluminum, lead, tin, nickel.

17. The method according to claim 15, wherein the metal comprises a transition metal.

18. The method according to claim 12, wherein the conductive additives comprise one or more semiconductors.

19. The method according to claim 12, wherein the conductive additives comprise long narrow filaments with an aspect ratio of 20 or greater.

20. The method according to claim 12, wherein the cracks form after one or more formation processes and/or one or more lithiation/delithiation cycles of a battery incorporating the electrode.

21. The method according to claim 12, wherein islands adjacent to a particular crack have mirror image surfaces facing the particular crack.

22. The method according to claim 12, wherein the conductive additives comprise between 1% and 40% of the active material layer.

23. A battery, the battery comprising:
a battery comprising a cathode, an electrolyte, and an anode comprising a metal current collector and an active material layer on the current collector, wherein the active material layer comprises:
islands of material separated by cracks, the islands comprising:
silicon;
pyrolyzed binder; and
conductive additives, wherein at least a portion of the additives extend from within the islands and bridge the cracks of the active material layer;
wherein:
the conductive additives comprise one-dimensional (1D) conductive additives, two-dimensional (2D) conductive additives, and three-dimensional (3D) conductive additives; and
one of the 1D conductive additives, the 2D conductive additives, and the 3D conductive additives is at least 4× of the conductive additives of other dimensions.

* * * * *